US010196096B2

(12) United States Patent
Sato et al.

(10) Patent No.: US 10,196,096 B2
(45) Date of Patent: Feb. 5, 2019

(54) VEHICLE-BODY STRUCTURE OF VEHICLE

(71) Applicant: MAZDA MOTOR CORPORATION, Hiroshima (JP)

(72) Inventors: Kenichi Sato, Hiroshima (JP); Keizo Kawasaki, Hiroshima (JP); Takeshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 46 days.

(21) Appl. No.: 15/512,811

(22) PCT Filed: Aug. 8, 2016

(86) PCT No.: PCT/JP2016/073251

§ 371 (c)(1),
(2) Date: Mar. 20, 2017

(87) PCT Pub. No.: WO2017/030031

PCT Pub. Date: Feb. 23, 2017

(65) Prior Publication Data

US 2017/0305470 A1 Oct. 26, 2017

(30) Foreign Application Priority Data

Aug. 17, 2015 (JP) ................................ 2015-160490

(51) Int. Cl.
*B62D 27/02* (2006.01)
*B62D 25/02* (2006.01)
(Continued)

(52) U.S. Cl.
CPC ............ *B62D 27/02* (2013.01); *B62D 25/02* (2013.01); *B62D 25/04* (2013.01); *B62D 25/06* (2013.01); *B62D 27/04* (2013.01); *B62D 25/025* (2013.01)

(58) Field of Classification Search
CPC ........ B62D 27/02; B62D 25/02; B62D 25/04; B62D 25/06; B62D 27/04
(Continued)

(56) References Cited

U.S. PATENT DOCUMENTS 5,671,968 A * 9/1997 Masuda ............... B62D 21/157 296/187.12
8,708,390 B2 * 4/2014 Kurogi ................... B62D 25/02 296/203.03

(Continued)

FOREIGN PATENT DOCUMENTS

JP 2007-313963 A 12/2007
JP 2013-049376 A 3/2013
JP 2013-049377 A 3/2013

OTHER PUBLICATIONS

International Search Report issued in PCT/JP2016/073251; dated Oct. 25, 2016.

*Primary Examiner* — Joseph D. Pape
(74) *Attorney, Agent, or Firm* — Studebaker & Brackett PC

(57) ABSTRACT

A vehicle-body structure of a vehicle includes a first frame forming a closed cross-section portion, a reinforcing member disposed in the closed cross-section portion and connected to the first frame, and another vehicle-body member connected to an outer surface of the first frame. A connection portion of the first frame and the reinforcing member includes a rigid joint portion where the first frame and the reinforcing member are joined, and a flexible joint portion where the first frame and the reinforcing member are joined, with a damper member being disposed therebetween. The other vehicle-body member is connected to the first frame in a manner such that at least a part of the other vehicle-body member overlaps the flexible joint portion in a thickness direction of the first frame, and has a high rigidity portion (Continued)

that enhances rigidity at the part that overlaps the flexible joint portion.

6 Claims, 18 Drawing Sheets

(51) Int. Cl.
*B62D 25/04* (2006.01)
*B62D 25/06* (2006.01)
*B62D 27/04* (2006.01)

(58) Field of Classification Search
USPC .................. 296/193.06, 203.03, 210, 29, 30
See application file for complete search history.

(56) References Cited

U.S. PATENT DOCUMENTS

2013/0049392 A1 2/2013 Kurogi et al.
2013/0049405 A1 2/2013 Kurogi et al.

* cited by examiner

FRONT
J
111
W12
W11
133
W2
W13
13
131
11
113
114

FRONT
J
111
W12
W11
W13
132
134
13
11
113
114

J
312
3
31
30
311
W13
134
132
W12
301
302
W11
322
32
W14
112
321
311A
31A
W2
FRONT
11
134
13
300
30A
32A
321A
115
116

TOP
REAR
FRONT
BOTTOM
XI
XI
312
311
34
31
30
301
302
TA
35
L
32
322
321
3
112
31A
30A
300
32A
11
134
13

111
112
11
132(134)
32A
21(3)
4
30A
131(133)
21B
31A
300
100
212
32
4
211
30(302)
21F
132(134)
REAR
FRONT
31
3

VEHICLE-BODY STRUCTURE OF VEHICLE

TECHNICAL FIELD

The present invention relates to a vehicle-body structure of a vehicle, and more particularly to a vehicle-body structure including a structure in which a reinforcing member having a damper member is disposed in a closed cross-section portion.

BACKGROUND ART

In vehicles such as automobiles, a vehicle-body structure is required that prevents vibrations that can occur in vehicle parts from being transmitted into a vehicle cabin as much as possible to improve ride comfort (sense of damped vibration) for occupants. To meet this requirement, the applicant has, in Patent Literature 1, proposed a technique that has an ingenious feature in the form of connecting a bulkhead (a reinforcing member) disposed within a frame that forms a closed cross-section to the frame. The connection form includes a rigid joint portion where the frame and the bulkhead are joined in a state of coming into contact with each other, and a flexible joint portion where the frame and the bulkhead are joined in a state of being disposed with a damper member therebetween.

In using a bulkhead including the rigid joint portion and the flexible joint portion in a closed cross-section portion, it is critical to effectively enhance vibration damping performance by means of a damper member. Unfortunately, depending on vehicle-body structures, distortion stress caused in association with vehicle vibrations cannot be concentrated on the damper member, failing to achieve a satisfactory vibration damping effect.

CITATION LIST

Patent Literature

Patent Literature 1: Japanese Unexamined Patent Publication No. 2013-49376

SUMMARY OF INVENTION

An object of the present invention is to provide a vehicle-body structure including a structure in which a reinforcing member having a damper member is disposed in a closed cross-section portion, the vehicle-body structure effectively enhancing vibration damping performance by means of the damper member.

A vehicle-body structure of a vehicle according to an aspect of the present invention includes a first frame forming a closed cross-section portion and extending in a first direction, a reinforcing member disposed in the closed cross-section portion and connected to the first frame, and another vehicle-body member connected to an outer surface of the first frame, wherein a connection portion of the first frame and the reinforcing member includes a rigid joint portion where the first frame and the reinforcing member are joined in a state of coming in contact with each other, and a flexible joint portion where the first frame and the reinforcing member are joined, with a damper member being disposed therebetween, and the other vehicle-body member is connected to the first frame in a manner such that at least a part of the other vehicle-body member overlaps the flexible joint portion in a thickness direction of the first frame, and has a high rigidity portion that enhances rigidity at the part that overlaps the flexible joint portion.

DESCRIPTION OF EMBODIMENTS

An embodiment according to the present invention will now be described in detail with reference to the figures.

[Overall Description of Vehicle-body]

Figure 1:
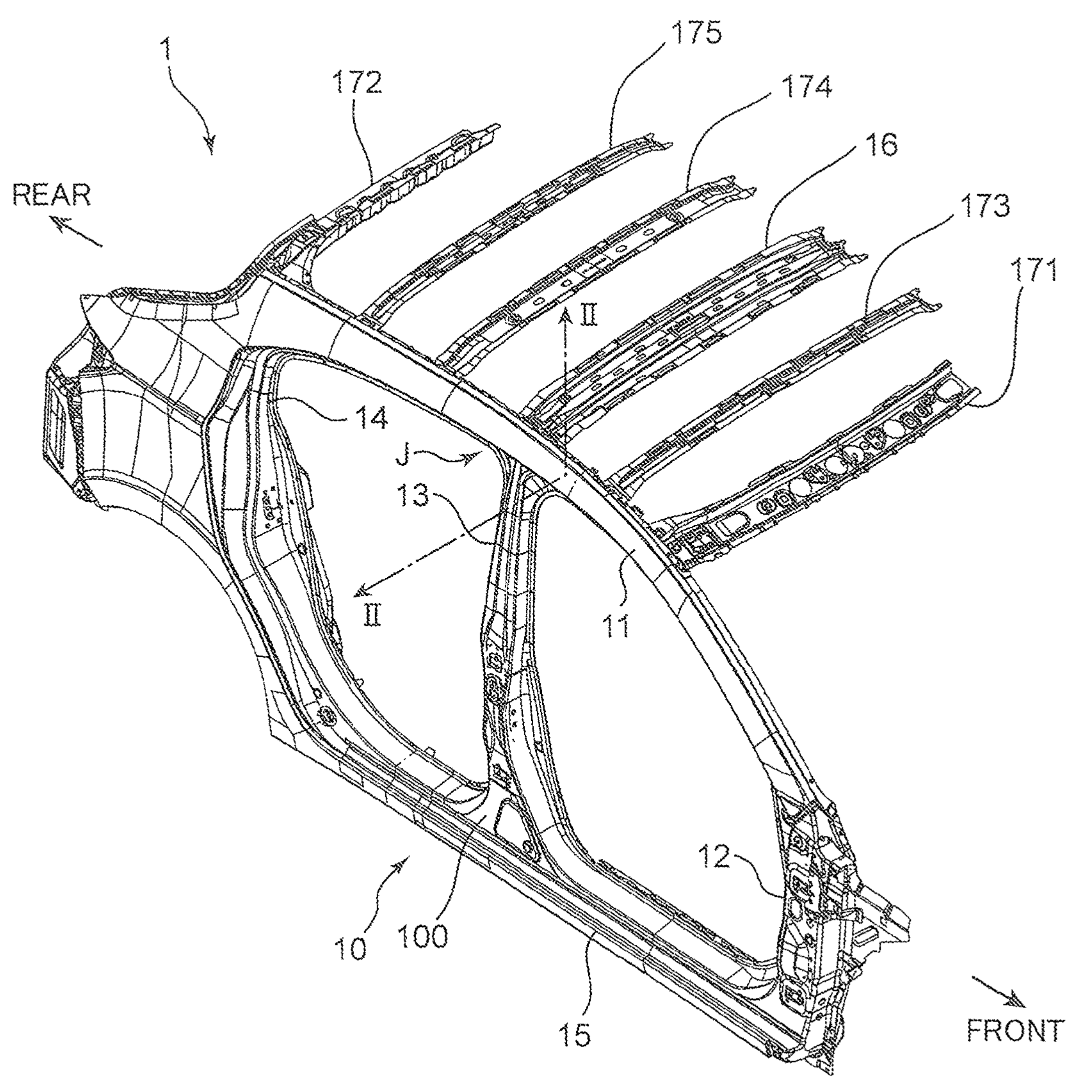
FIG. 1 is a perspective view showing a part of a vehicle-body of a vehicle to which the present invention is adopted.

FIG. 1 is a perspective view showing a part of a vehicle-body 1 of a vehicle to which the present invention is adopted. In the figure, a “front” arrow is added to indicate a direction toward the front of the vehicle, and a “rear” arrow to indicate a direction toward the rear of the vehicle. Arrows including “front” arrows and “rear” arrows added in the subsequent figures correspond to the front and the rear of the vehicle shown in FIG. 1.

The vehicle-body 1 includes side frames 10 that constitute left and right sides of the vehicle. FIG. 1 shows the side frame 10 on one side alone. The side frame 10 includes a side frame outer 100 that is to serve as an exterior of a side part of the vehicle, a roof rail 11 disposed at an indoor side of the side frame outer 100, a front pillar 12, a center pillar 13, a rear pillar 14, and a side sill 15.

The side frame outer 100 is a panel formed by shaping a single steel plate into a predetermined shape by stamping, and punching front and back door openings. An outer surface of the side frame outer 100 is to serve as an exterior paint surface of the vehicle. The roof rail 11, at an upper part of the vehicle, and the side sill 15, at a lower part of the vehicle, each extend in the anteroposterior direction of the vehicle. The roof rail 11 and the side sill 15 are connected in the vertical direction by three pillars disposed therebetween or the front pillar 12 at a frontward side, the rear pillar 14 at a rearward side, and the center pillar 13 around the anteroposterior center.

The roof rail 11 (first frame) extending in the anteroposterior direction (first direction) and the center pillar 13 (second frame) extending in the vertical direction (second direction intersecting the first direction) forms a joint section J where the both intersect in a substantially T shape, in a form such that an upper end portion of the center pillar 13 is joined to an anteroposterior middle portion of the roof rail 11. The present embodiment shows an example in which the vehicle-body structure according to the present invention is applied to the joint section J.

Between the roof rail 11 of the side frame 10 at the one side and a roof rail (not shown) of a side frame at the other side, multiple reinforcements (hereinafter referred to simply as "reinforcement" in the present description) and headers extending in the vehicle-widthwise direction are disposed. In the present embodiment, at a position where the center pillar 13 is provided, a roof reinforcement 16 is disposed, and at its frontward and rearward sides, three roof reinforcements 173, 174, and 175 are disposed. Further, a front header 171 and a rear header 172 are disposed at frontward and rearward sides of the vehicle, respectively. Between the pair of side frames 10, a roof panel 102 (FIG. 2), which is not shown in FIG. 1, is mounted so as to cover those roof reinforcements and headers.

[Structure of Joint Section J]

Figure 2:
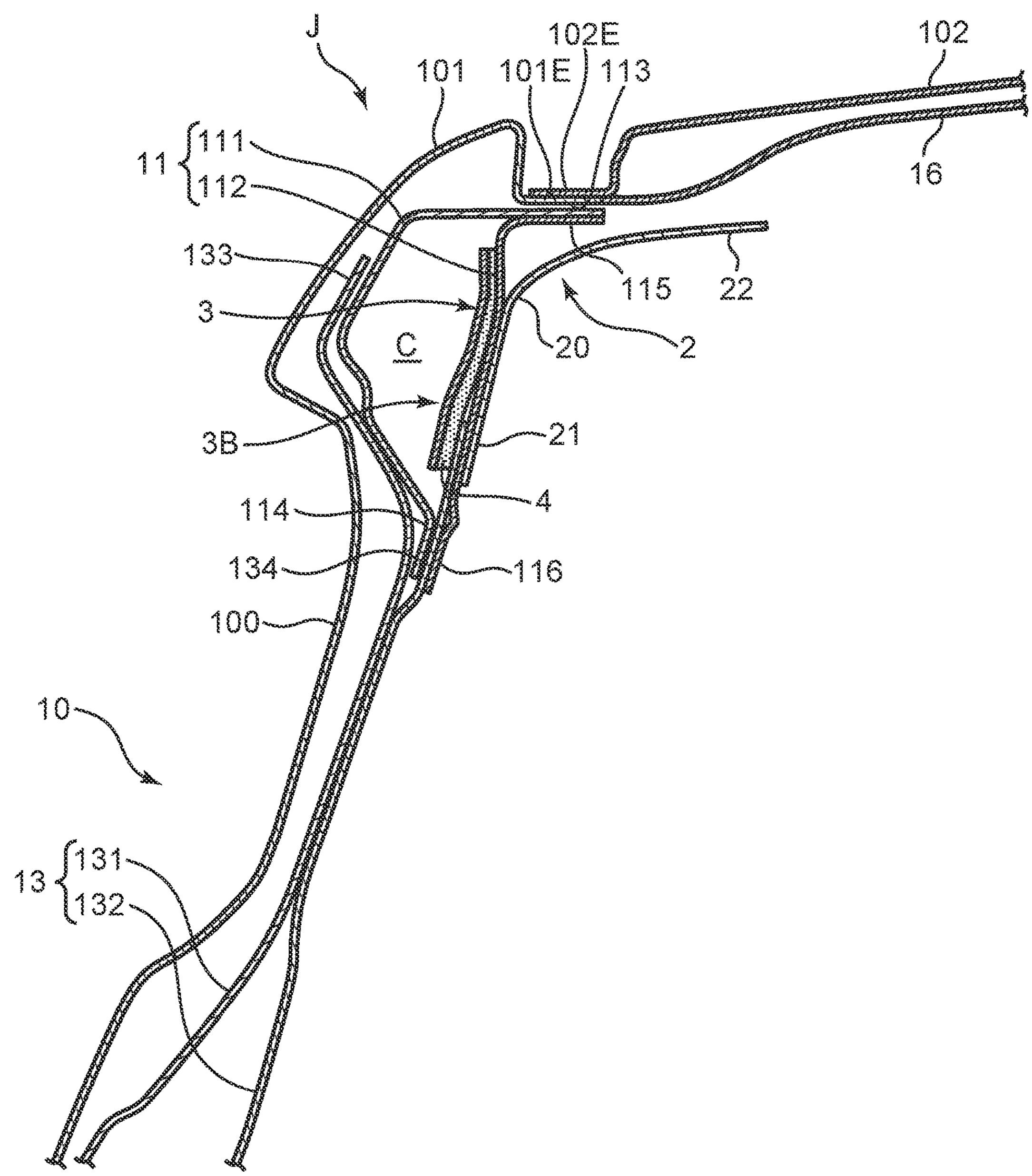
FIG. 2 is a schematic sectional view taken along line II-II of FIG. 1.

FIG. 2 is a schematic sectional view taken along line II-II of FIG. 1. The joint section J of the roof rail 11 and the center pillar 13 is covered by the side frame outer 100 at the outdoor side, and is furnished with a roof gusset 2 (other vehicle-body member) at the indoor side. Further, within a closed cross-section portion C, at the joint section J, of the roof rail 11, a bulkhead 3 (reinforcing member) is disposed. The constituent members will now be described.

The roof rail 11 is a vehicle-body rigid member having a closed cross-section that extends in the anteroposterior direction, and is formed of a roof rail outer reinforcement 111 of a substantially U shape in a sectional view and a roof rail inner 112 of a substantially L shape in sectional view. The roof rail outer reinforcement 111 at the outdoor side has an upper flange portion 113 for connection at the upper edge and a lower flange portion 114 for connection at the lower edge. The roof rail inner 112 at the indoor side similarly has an upper flange portion 115 and a lower flange portion 116. The upper flange portions 113 and 115 and the lower flange portions 114 and 116 each butt against each other and are fixed by, e.g. spot welding. The roof rail outer reinforcement 111 and the roof rail inner 112 thus fixed form the closed cross-section portion C.

The center pillar 13 is a vehicle-body rigid member having a closed cross-section that extends in the vertical direction, and is formed of a center pillar outer reinforcement 131 at the outdoor side and a center pillar inner 132 at the indoor side. The center pillar outer reinforcement 131 has, around the upper end, a shape bent toward the outdoor side, and at this portion of the bent shape, an outer flange portion 133 is formed. The center pillar inner 132 is a mostly flat plate, and around its upper end, an inner flange portion 134 is formed.

Figure 3:
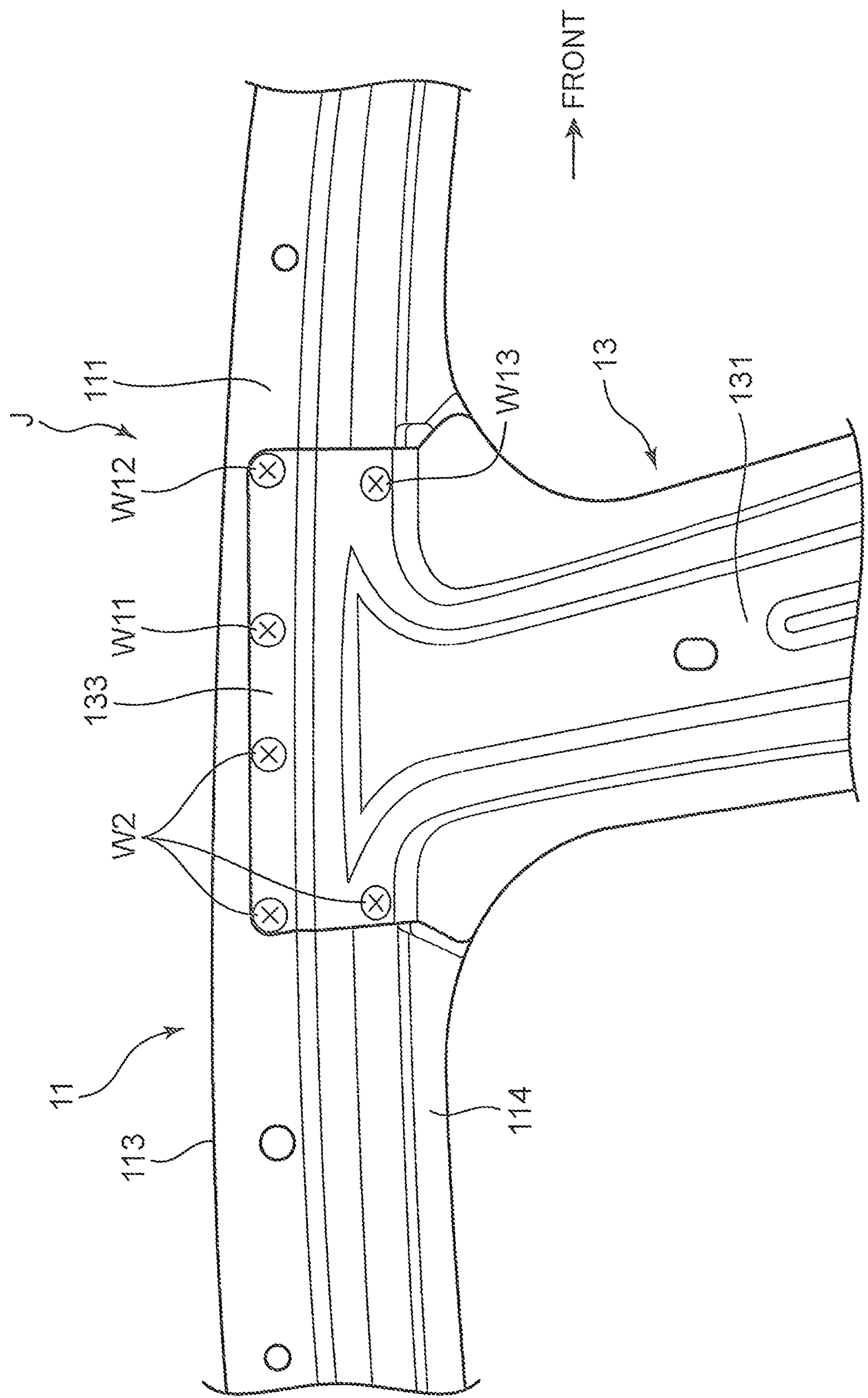
FIG. 3 is a side view of a joint section of a roof rail and a center pillar of the vehicle-body as seen from an outdoor side of the vehicle, the side view showing the state with a side frame outer removed.

FIG. 3 is a side view of the joint section J as seen from the outdoor side of the vehicle, the view showing the state with the side frame outer 100 removed. The outer flange portion 133 of the center pillar outer reinforcement 131 has a bent shape mostly in conformance with the shape of an outer surface of the roof rail outer reinforcement 111. The outer flange portion 133 is put in contact with the outer surface of the roof rail outer reinforcement 111 and is fixed to it by spot welding.

Figure 4:
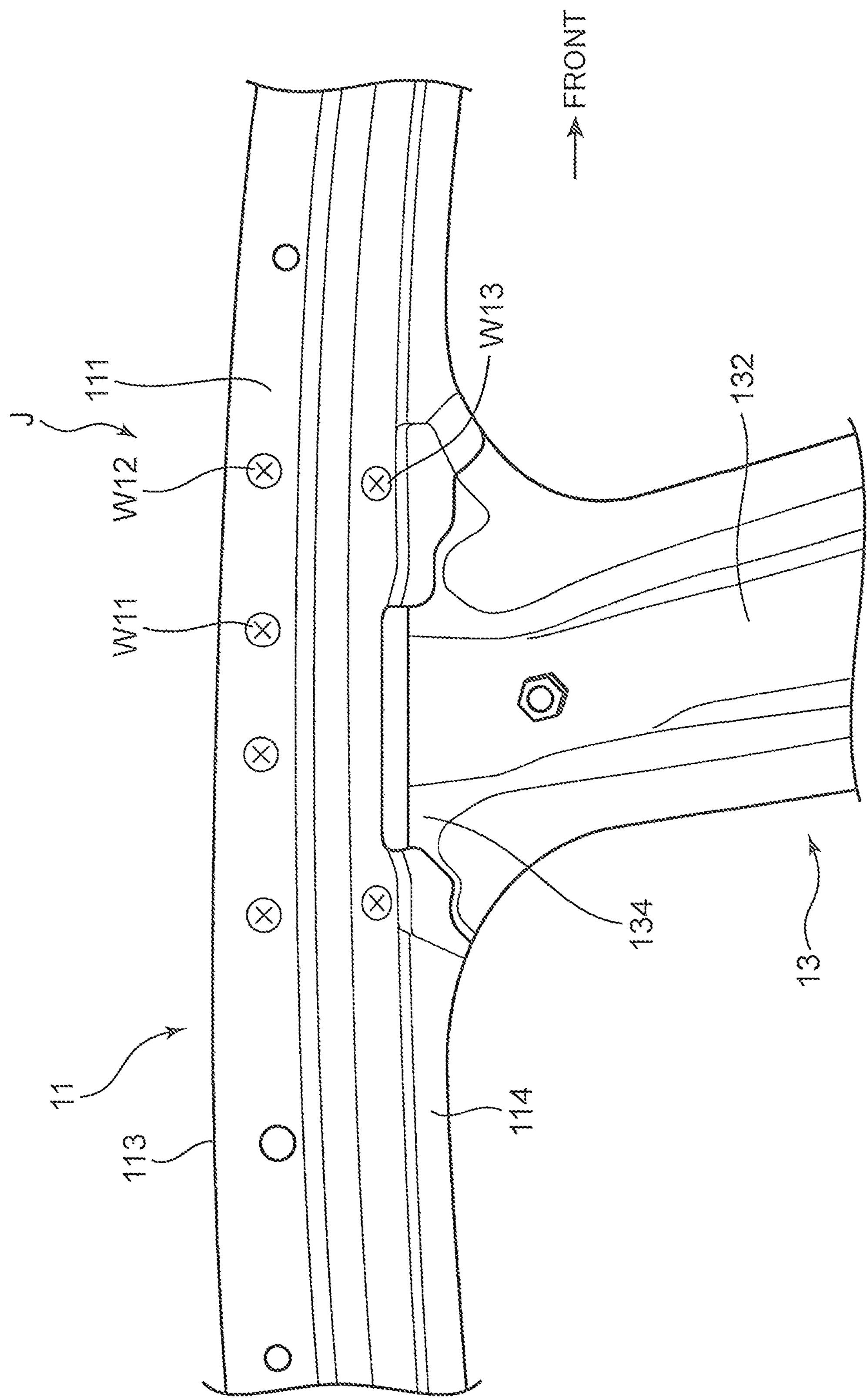
FIG. 4 is a side view showing the state with a center pillar outer reinforcement removed from the state in FIG. 3.

FIG. 4 is a side view showing the state with the center pillar outer reinforcement 131 removed from the state in FIG. 3. The inner flange portion 134 of the center pillar inner 132 is disposed partially between the lower flange portion 114 of the roof rail outer reinforcement 111 and the lower flange portion 116 of the roof rail inner 112. The lower flange portion 114 and the lower flange portion 116 are fixed with the inner flange portion 134 therebetween.

The fixation of the outer flange portion 133 and the inner flange portion 134, as described, joins the center pillar 13 to the roof rail 11. The joint section J is covered by an upper end part 101 of the side frame outer 100. The upper end part 101 is a bulging part that tends toward the top from the side of the vehicle. An edge 101E of the upper end part 101 and an edge 102E of the roof panel 102 are stacked so as to vertically overlap each other. The stack of the edges 101E and 102E is disposed on a stack of the upper flange portions 113 and 115 and fixed to these portions.

Figure 5:
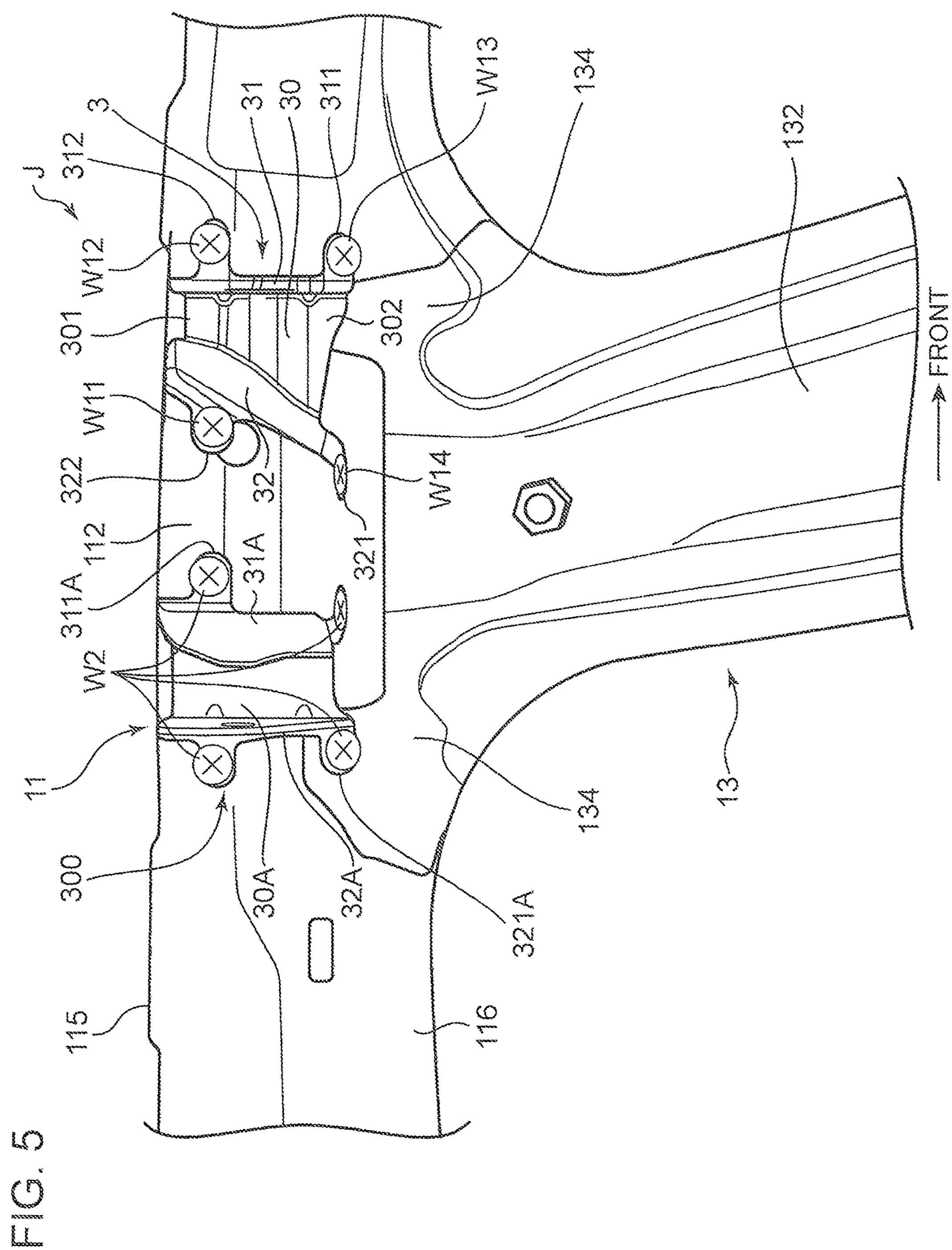
FIG. 5 is a side view showing the state with a roof rail outer reinforcement removed from the state in FIG. 4.

FIG. 5 is a side view showing the state with the roof rail outer reinforcement 111 removed from the state in FIG. 4. Within the closed cross-section portion C, around the joint section J, of the roof rail 11, two bulkheads 3 and 300 are provided to serve as reinforcing members for enhancing rigidity of the roof rail 11. These bulkheads 3 and 300 have a plurality of connection portions for the roof rail 11.

In FIG. 2, the one bulkhead 3 is shown. As shown in FIG. 2, the plurality of connection portions includes a rigid joint portion 3A where the roof rail 11 and the bulkhead 3 are joined in a state of coming in contact with each other and a flexible joint portion 3B where the roof rail 11 and the bulkhead 3 are joined in a state of being disposed with a damper member 4 therebetween. Similarly, the other bulkhead 300 also includes a rigid joint portion and a flexible joint portion. Marks indicated with reference signs W11, W12, W13, W14, and W2 shown in FIG. 3 to FIG. 5 are spot-welding portions, which correspond to the rigid joint portion 3A in the bulkheads 3 and 300. The bulkhead 3 will be described later in detail with reference to FIG. 6 to FIG. 11.

The roof gusset 2 is a vehicle-body member that reinforces the joint of the roof reinforcement 16 to the roof rail 11. The roof gusset 2 is connected to an outer surface of the roof rail 11 (roof rail inner 112) and to the roof reinforcement 16. The roof gusset 2 includes a main portion 20, a first abutment portion 21 formed of a bent portion continuously provided to the lower end of the main portion 20, and a second abutment portion 22 formed of a bent portion continuously provided to the upper end of the main portion 20. The first abutment portion 21 is connected to the roof rail inner 112, and the second abutment portion 22 is connected to the roof reinforcement 16. This roof gusset 2 will be described later in detail with reference to FIG. 12 to FIG. 18.

[Detailed Description of Bulkheads]

Figure 6:
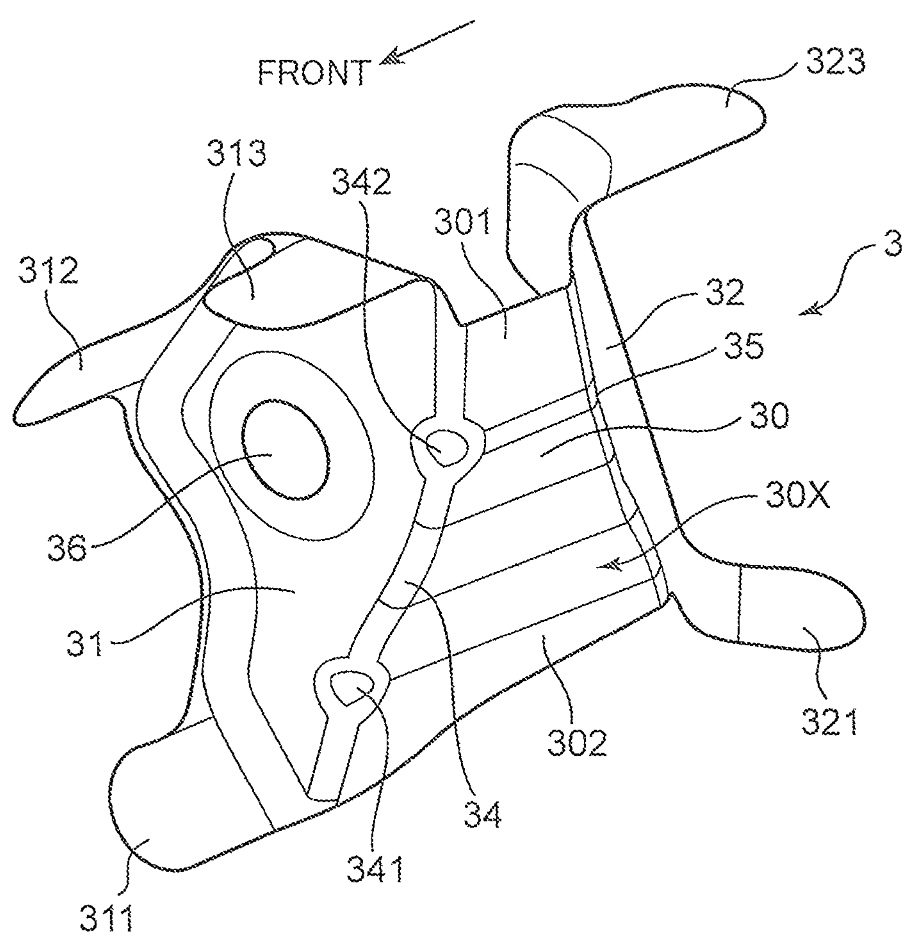
FIG. 6 is a perspective view of a bulkhead disposed within a closed cross-section portion of the roof rail.
Figure 7:
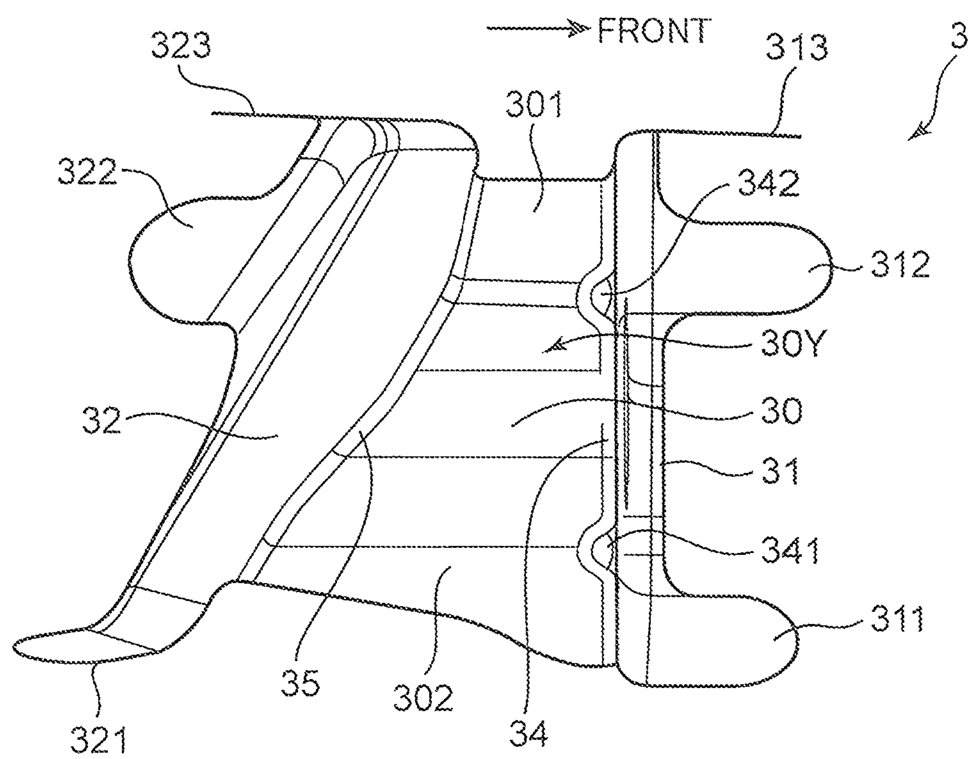
FIG. 7 is a front view of the bulkhead.
Figure 8:
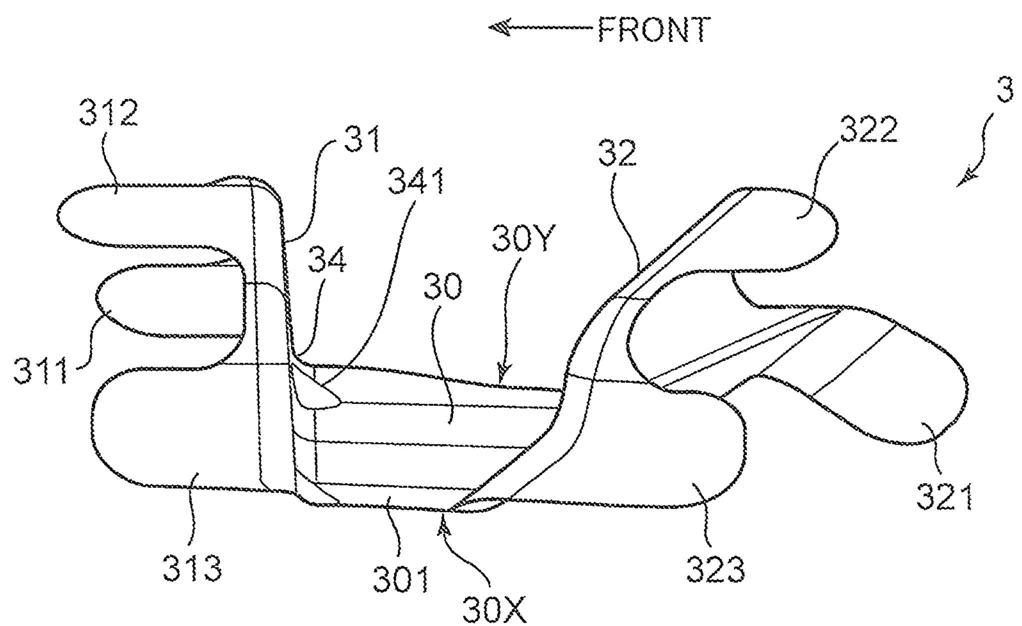
FIG. 8 is a side view of the bulkhead.

The bulkhead 3 will now be described in detail. FIG. 6 is a perspective view of the bulkhead 3 according to the present embodiment, FIG. 7 is its front view, and FIG. 8 is its side view. The bulkhead 3, which is also called a partition member, is formed by subjecting a plate having a high rigidity, such as steel plate, to punching, bending or the like.

The bulkhead 3, which includes a base plate portion 30, a first side plate portion 31 raised by bending at one side end of the base plate portion 30, and a second side plate portion 32 raised by bending at the other side end of the base plate portion 30, is a member that includes a part having a substantially U shape in an anteroposterior sectional view. The bending of the first side plate portion 31 forms a first ridge portion 34 on the boundary between the base plate portion 30 and the first side plate portion 31. The bending of the second side plate portion 32 forms a second ridge portion 35 on the boundary between the base plate portion 30 and the second side plate portion 32. The first side plate portion 31 is raised by bending at an angle of substantially 90° relative to the base plate portion 30, and the second side plate portion 32 is raised by bending at an angle of about 45° relative to the base plate portion 30.

In other words, the first side plate portion 31 and the second side plate portion 32 are portions that function as a pair of partitions that divides the closed cross-section portion C (FIG. 2), and the base plate portion 30 is a portion that functions as a joint section that connects the first side plate portion 31 and the second side plate portion 32. The first side plate portion 31 and the second side plate portion 32, as partitions, form faces within the closed cross-section portion C, the faces extending in a direction mostly orthogonal to a direction in which the closed cross-section portion C extends. Accordingly, the incorporation of the bulkhead 3 enhances resistance against a deformation force that presses and collapses the closed cross-section portion C of the roof rail 11, or a deformation force that causes a collapse in a manner such that the roof rail outer reinforcement 111 and the roof rail inner 112 approach each other.

In the present embodiment, peripheries of the first side plate portion 31 and the second side plate portion 32 are portions that form the rigid joint portion 3A, and the base plate portion 30 is a portion that forms the flexible joint portion 3B. On the periphery of the first side plate portion 31, a first flange portion 311, a second flange portion 312, and a third flange portion 313 are provided in a protruding manner. These flange portions 311, 312, and 313, which have tongue-like shapes, are formed by each bending at an approximately right angle to the first side plate portion 31 in a direction opposite to a direction toward the second side plate portion 32. Similarly, on the periphery of the second side plate portion 32, a fourth flange portion 321, a fifth flange portion 322, and a sixth flange portion 323, each in a tongue-like shape, are provided in a protruding manner. The flange portions 321, 322, and 323 are formed by each bending in a direction opposite to a direction toward the first side plate portion 31.

The flange portions 311, 312 and 313 and the flange portions 321, 322, and 323, which are portions that come in contact with an inner surface of the roof rail outer reinforcement 111, are each fixed to the inner peripheral surface by spot welding. In FIG. 3 to FIG. 5, the spot-welding portion W11 is a portion where the flange portion 322 is fixed to the roof rail outer reinforcement 111. Similarly, the spot-welding portion W12 is a fixation potion for the flange portion 312, the spot-welding portion W13 for the flange portion 311, and the spot-welding portion W14 for the flange portion 321.

The base plate portion 30 is a portion that faces an inner surface of the roof rail inner 112. The base plate portion 30 in the present embodiment is curved slightly in a convex shape in a direction in which the side plate portions 31 and 32 are raised by bending, and has a substantially trapezoidal shape in a front view (FIG. 7). The base plate portion 30 has a first surface 30X, which faces the roof rail inner 112, and a second surface 30Y at an opposite side thereto. The first surface 30X serves as a connection region that is put in contact with the damper member 4 in the flexible joint portion 3B. That is to say, the first surface 30X faces the inner surface of the roof rail inner 112 while leaving a clearance of a predetermined distance from it, and in this clearance, the damper member 4 is interposed. In other words, the base plate portion 30 and the roof rail inner 112 are connected with the damper member 4 disposed therebetween. The connection region, which has a width that increases in a direction toward the center pillar 13 along the vertical direction in which the center pillar 13 extends, has a substantially trapezoidal shape (refer to FIG. 5). Meaning of the trapezoidal shape will be described later.

The present embodiment exemplifies the rigid joint portion 3A in a form such that the six flange portions 311 to 323 are spot welded to the roof rail outer reinforcement 111. The number of flange portions—the number of spot-welding portions—is one example, and can be determined appropriately according to the shape or the like of the roof rail 11. Further, the peripheries of the first and second side plate portions 31 and 32 may be welded to the roof rail outer reinforcement 111, without forming flange portions for the rigid joint portion.

The rigid joint portion 3A, which can be formed by means other than spot welding, may be a mechanical joint portion using, for example, bolts, nuts, and the like. In such a case, the flange portions 311 to 323 and the roof rail outer reinforcement 111 are perforated with holes for inserting bolts. Alternatively, the rigid joint portion 3A may be an adhesion portion by means of an adhesive. In such a case, adhesives ordinarily used for adhesion in vehicle-bodies can be used as the adhesive. For example, on the conditions that the temperature is 20° C. and the frequency of the excitation force is 30 Hz, an adhesive having a storage elastic modulus of 2000 Mpa or larger and a loss factor of 0.05 or smaller can be preferably used.

The damper member 4 that constitutes the flexible joint portion 3B is a member capable of damping vibrations. As the damper member 4, any member having a predetermined viscoelasticity can be used without particular limitation. For example, a viscoelastic member composed of silicone material or acrylic material can be used. As for physical properties of the viscoelastic member, on the conditions that the temperature is 20° C. and the frequency of the excitation force is 30 Hz, a member having a storage elastic modulus of 500 Mpa or smaller and a loss factor of 0.2 or larger is preferable in view of effective prevention of vibration transmission. The damper member 4 composed of such a viscoelastic member absorbs vibration energy as distortion energy, and converts this energy into thermal energy to release it, thus damping vibrations.

The method of mounting the damper member 4 on the first surface 30X (connection region) of the base plate portion 30 is not particularly limited. For example, applying a pasty viscoelastic member in a predetermined thickness on the base plate portion 30 forms a layer that is to serve as the damper member 4. Alternatively, preparing bulk pieces that is to serve as the damper member 4 and pasting them on the base plate portion 30 can also work.

In the first ridge portion 34 on the boundary between the base plate portion 30 and the first side plate portion 31, two recess portions 341 and 342 are provided. These recess portions 341 and 342 are provided to enhance rigidity of the bulkhead 3. The recess portions 341 and 342 are hemispheric shaped recess portions formed by drawing a part of the first ridge portion 34 in a direction protruding from the second surface 30Y. The recess portions 341 and 342 thus formed further enhances rigidity of the bulkhead 3, accomplishing the original objective for the bulkhead—improvement in the performance of reinforcing the closed cross-section portion C.

Further, the recess portions 341 and 342 intended for higher rigidity bring about a larger difference in rigidity between the bulkhead 3 and the damper member 4. This further increases stress concentration on the damper member 4 when vibrations occur in the vehicle-body 1. In a case where the bulkhead 3 has a lower rigidity, or for example, in a case where the first side plate portion 31 bends and deforms at the first ridge portion 34 relatively easily, when vibrations are added to the bulkhead 3, the entire vibration stress would not be transmitted to the damper member 4 and part of the vibration stress would be consumed in the bending and deformation. Thus, the vibration damping effect by means of the damper member 4 would decrease. In contrast, the bulkhead 3 having higher rigidity enables transmission of vibration stress to the damper member 4 without loss, thus further enhancing vibration damping effects by means of the damper member 4.

The first side plate portion 31 is provided with a circular hole 36 that penetrates it in the anteroposterior direction. The hole 36 is a hole for favorably distributing fluid in the anteroposterior direction through a position where the bulkhead 3 is disposed. The first side plate portion 31 functions as a partition that divides the closed cross-section portion C. That is to say, the first side plate portion 31 obstructs the closed cross-section portion C of the roof rail 11 that extends in the anteroposterior direction. Processes of manufacturing the vehicle-body 1 include a process of applying electrodeposition coating of rust inhibitor to the vehicle-body 1 after the assembly of the vehicle-body 1, and the process includes immersing the vehicle-body 1 in an electrodeposition solution. In this regard, obstructing the closed cross-section portion C by the first side plate portion 31 could cause a failure of favorably distributing the electrodeposition solution to the inner surface of the roof rail 11. The formation of the hole 36 enables distribution of the electrodeposition solution through the hole 36, achieving a favorable electrodeposition coating.

In order to dry the rust inhibitor after the electrodeposition coating process, the vehicle-body 1 is fed into a thermal oven to execute a drying process of applying heat to the vehicle-body 1 at a predetermined temperature in a predetermined period of time. Heat produced in this drying process is desirably used for fixation of the damper member 4. That is to say, before the electrodeposition coating process, a pasty viscoelastic member is applied to the base plate portion 30, as described, to make the bulkhead 3 beforehand support a coating layer that is to serve as the damper member 4, and this bulkhead 3 is joined to the roof rail outer reinforcement 111 in a rigid manner (spot welding). Then, by using heat given to the vehicle-body 1 in the drying process, the coating layer is desirably fixed to the roof rail inner 112.

The other bulkhead 300 has a structure similar to that of the bulkhead 3 as descried. As seen from FIG. 5, the bulkhead 300, which includes a base plate portion 30A and a pair of side plate portions 31A and 32A raised by bending at front and rear edges of the base plate portion 30, is a member of a substantially U shape in the anteroposterior sectional view. On peripheries of the side plate portions 31A and 32A, a plurality of flange portions 311A and 321A is provided in a protruding manner. The flange portions 311A and 321A, which are portions that form a rigid joint portion, are fixed to the roof rail outer reinforcement 111 by spot welding. Reference sign W2 shown in FIG. 3 to FIG. 5 shows portions for the spot welding. The base plate portion 30A, which is a portion that forms a flexible joint portion, faces the roof rail inner 112 while leaving a clearance of a predetermined distance from it. Then, the damper member 4 is interposed in the clearance.

[Description of Connection Region of Damper Member]

Figure 9:
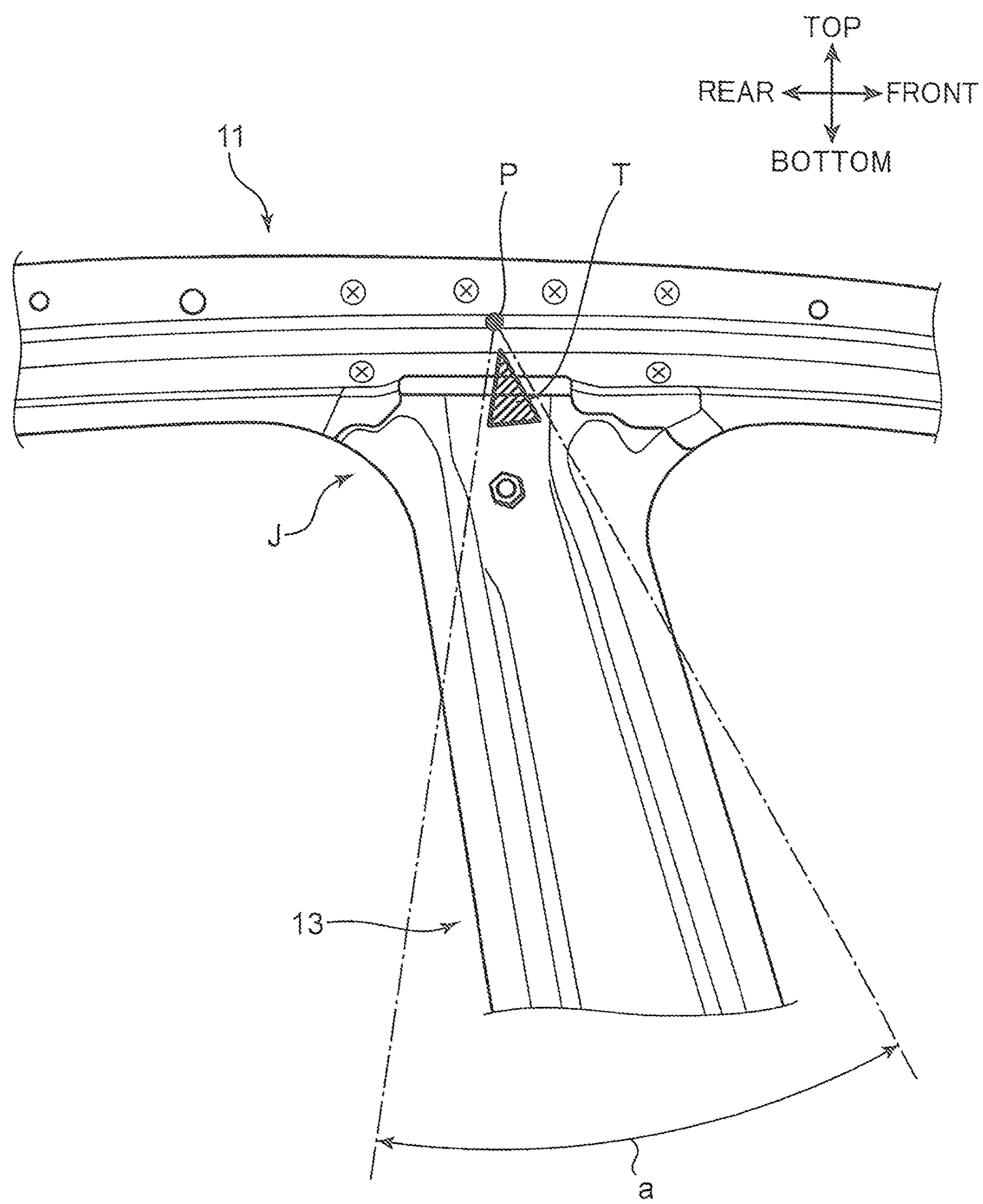
FIG. 9 is a side view for illustrating anteroposterior swinging of the center pillar.

As described, the first surface 30X of the base plate portion 30, which is a connection region of the damper member 4, is formed in a substantially trapezoidal shape having a width that increases in the direction toward the center pillar 13. Meaning of this will now be described. FIG. 9 is a side view for illustrating swinging of the center pillar 13. To the roof rail 11 extending in the anteroposterior direction, the center pillar 13 extending in the vertical direction is joined at the upper end portion. This joint section J is of a substantially T shape in a side view.

In the joint section J thus configured, the center pillar 13 swings on a joint point of the both as the center. FIG. 9 schematically shows this swinging. The point P is an imaginary point that shows the center of connection of the center pillar 13 to the roof rail 11. A vibration that occurs in the vehicle-body 1 can cause the center pillar 13 to swing in the anteroposterior direction on the point P as the center, as shown with the arrow a. As is obvious from FIG. 9, the swinging width at a part closer to the point P is relatively small, and the swinging width at a part farther from the point P is relatively large. The triangle T in the figure is a triangle that stands in correlation with this swinging width. The triangle T is of a shape having an anteroposterior width that gradually increases in a downward direction.

Figure 10:
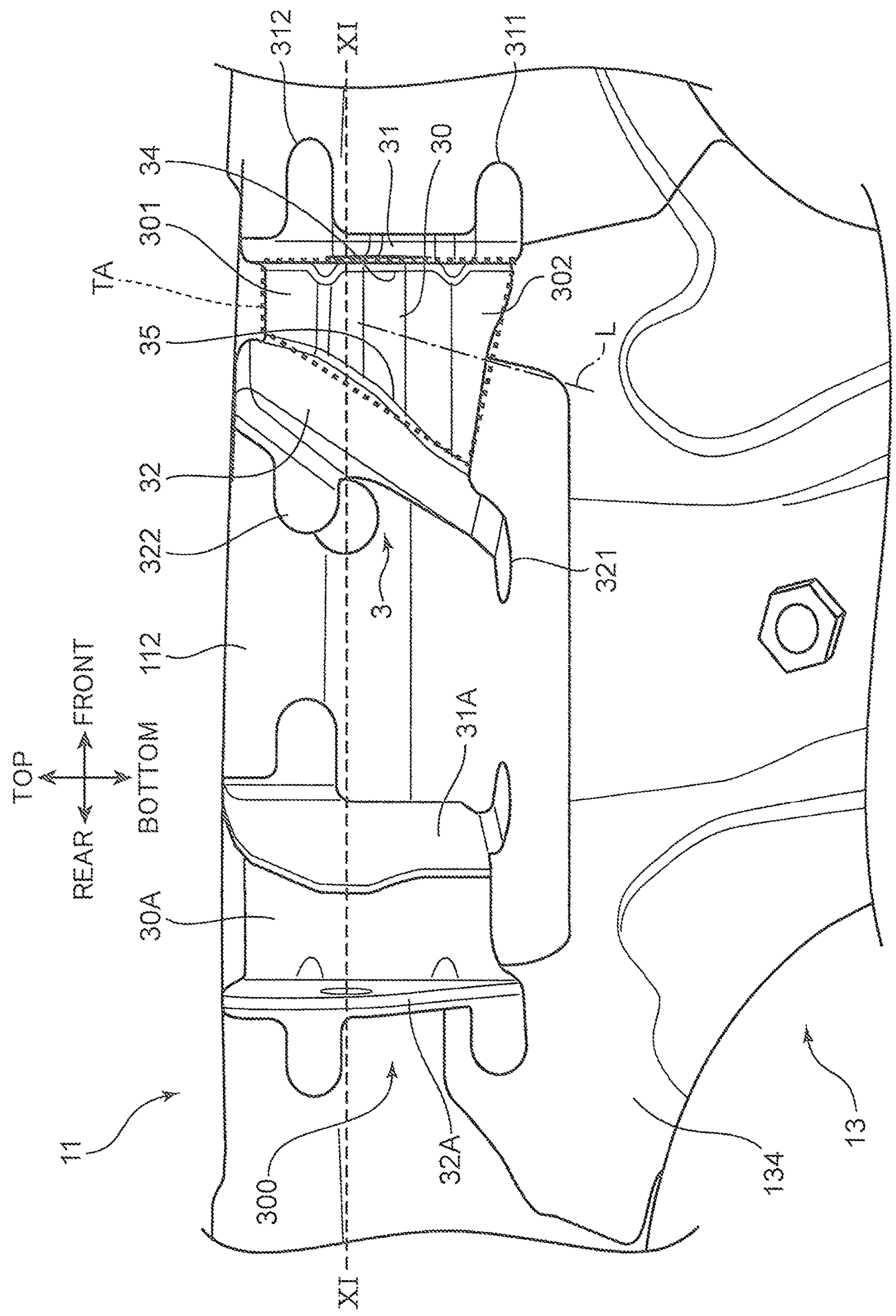
FIG. 10 is an enlarged view of the main components in FIG. 5.
Figure 11:
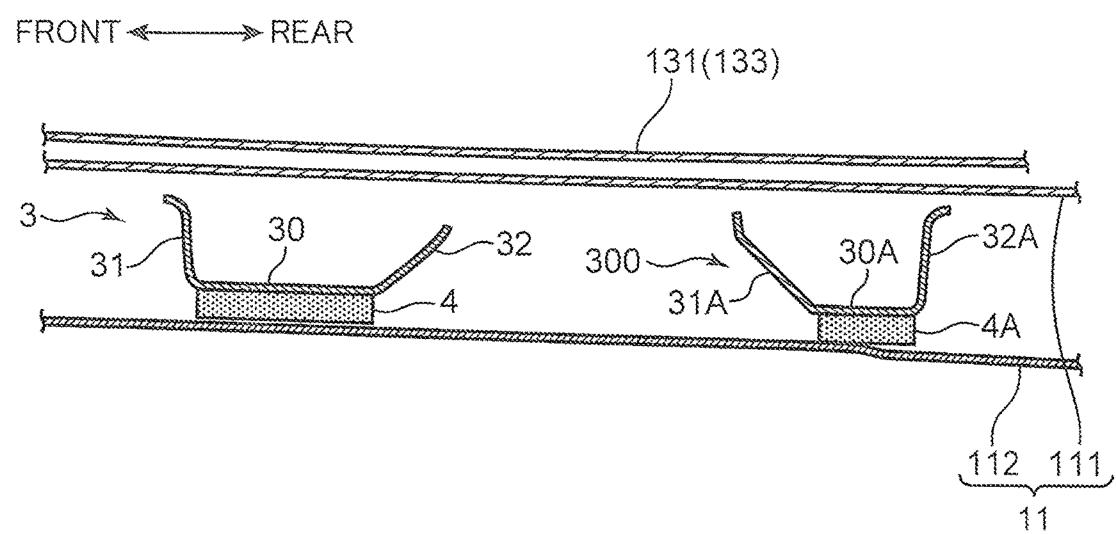
FIG. 11 is a schematic sectional view taken along line XI-XI of FIG. 10.

FIG. 10 is an enlarged view of the main components in FIG. 5, and FIG. 11 is a schematic sectional view taken along line XI-XI of FIG. 10. In FIG. 10, a schematic contour of the base plate portion 30 of the bulkhead 3 is shown with the dotted contour line TA. The shape indicated by the contour line TA is substantially trapezoidal. The base plate portion 30 has the narrowest anteroposterior width at an upper portion 301 and the widest anteroposterior width at a lower portion 302. The anteroposterior width at the lower portion 302 is appropriately two time as great as that at the upper portion 301. In a direction from the upper portion 301 to the lower portion 302, the anteroposterior width of the base plate portion 30 increases gradually.

The first ridge portion 34, which corresponds to the front side of the base plate portion 30, extends mostly along the vertical direction. Meanwhile, the second ridge portion 35, which corresponds to the rear side of the base plate portion 30, extends downward in a slanting direction. The bulkhead 3 is disposed at a position near the front end of the center pillar 13. The first ridge portion 34 is mostly flush with the front side of the upper end portion of the center pillar 13. In contrast, the second ridge portion 35 points around the anteroposterior widthwise center of the upper end portion of the center pillar 13.

The base plate portion 30 thus configured is shaped mostly in conformance with the shape of the triangle T shown in FIG. 9. That is to say, the base plate portion 30 is of a shape having a width that gradually increases in a direction (downward) in which the center pillar 13 protrudes and extends from the roof rail 11. This shape allows the damper member 4 to be disposed in a width-widening manner in a region where the center pillar 13 swings and deforms more largely. This improves performance capabilities of the flexible joint portion 3B in damping vibrations caused by anteroposterior swinging of the center pillar 13.

That is to say, as shown in FIG. 11, the base plate portion 30 (first surface 30X) is a surface that supports the damper member 4, and according to its width, the anteroposterior width of the damper member 4 is determined. Accordingly, as an anteroposterior width of the base plate portion 30 increases, an anteroposterior width of the damper member 4 also increases. The damper member 4 having a wider anteroposterior width exerts a higher performance in damping vibrations in the anteroposterior direction. Thus it can be said that the base plate portion 30 (damper member 4) in the present embodiment has a shape in conformance with the deformation movement of the center pillar 13. This dampens vibrations of the center pillar 13 effectively and improves riding comfort (the sense of damped vibration) of the vehicle.

In the present embodiment, an extending direction (second direction) of the center pillar 13 is slightly slanted relative to a perpendicular in the vertical direction. Although the center line L (FIG. 10) that passes through the center of the anteroposterior width of the base plate portion 30 is desirably in conformance with the extending direction, it is not necessarily required to. In fact, the center line L of the base plate portion 30 in the present embodiment is not in conformance with the extending direction. As seen, the extending direction and the center line L are simply required to be mostly in conformance with aligning directions.

[Detailed Description of Roof Gusset]

Figure 12:
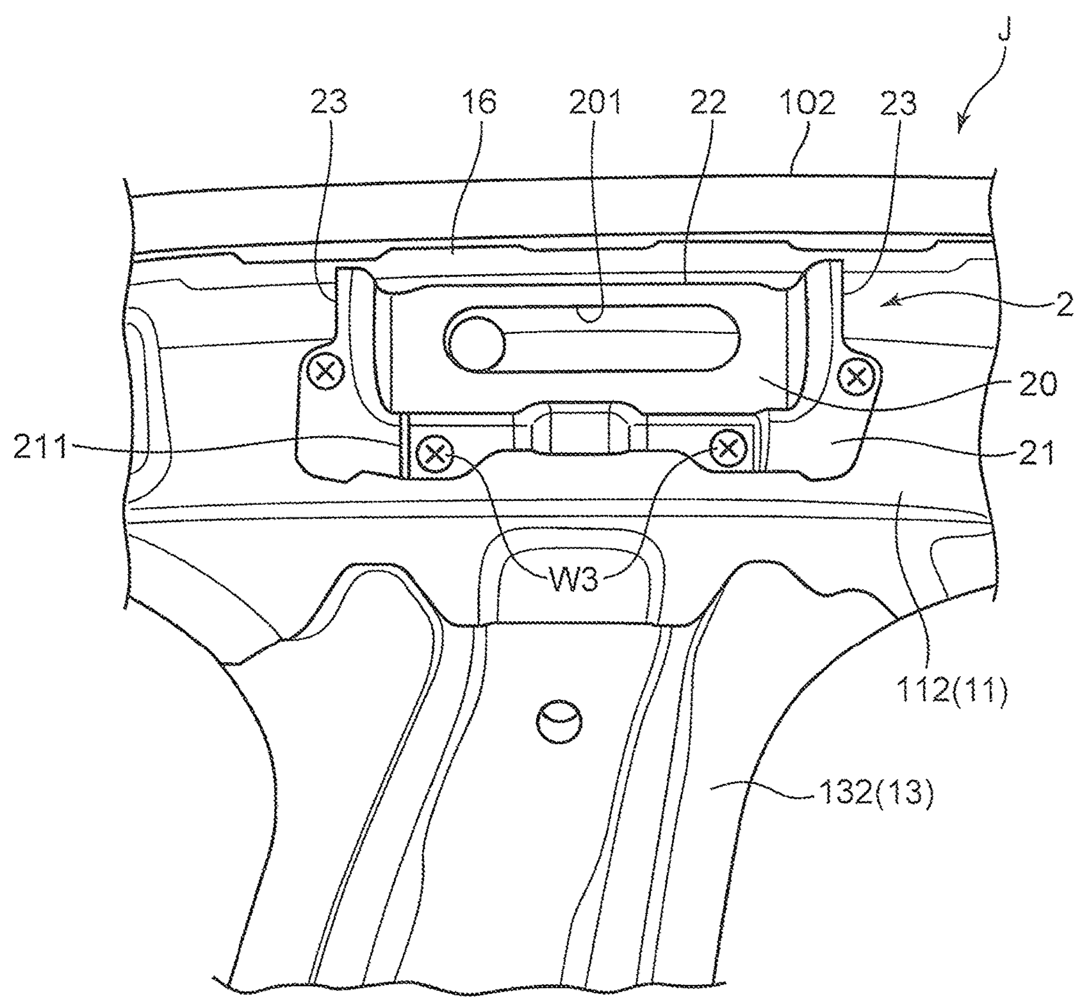
FIG. 12 is a side view of the joint section of the roof rail and the center pillar as seen, with a roof gusset mounted, from an indoor side of the vehicle.
Figure 13:
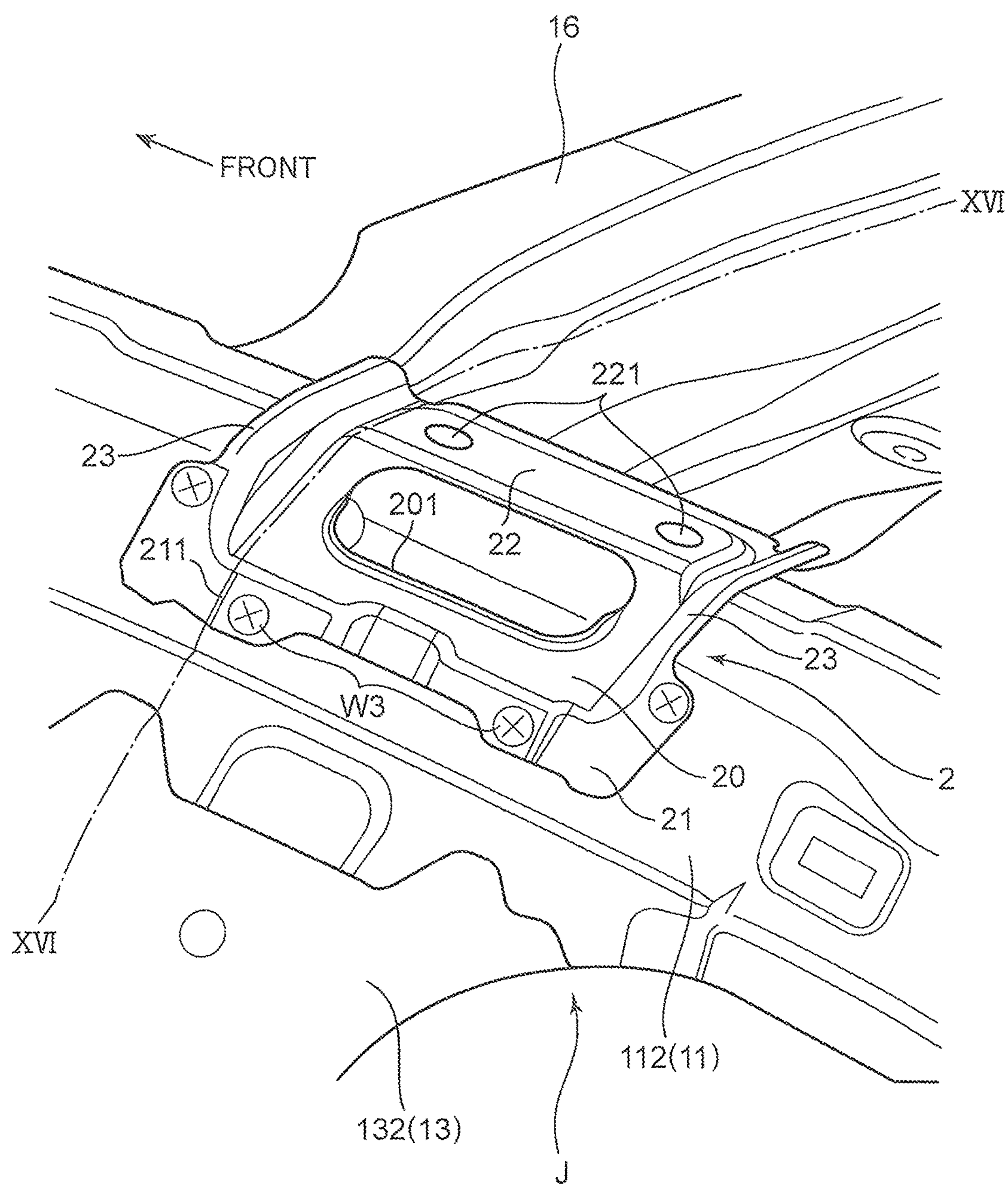
FIG. 13 is a perspective view of a portion where the roof gusset is mounted.
Figure 14:
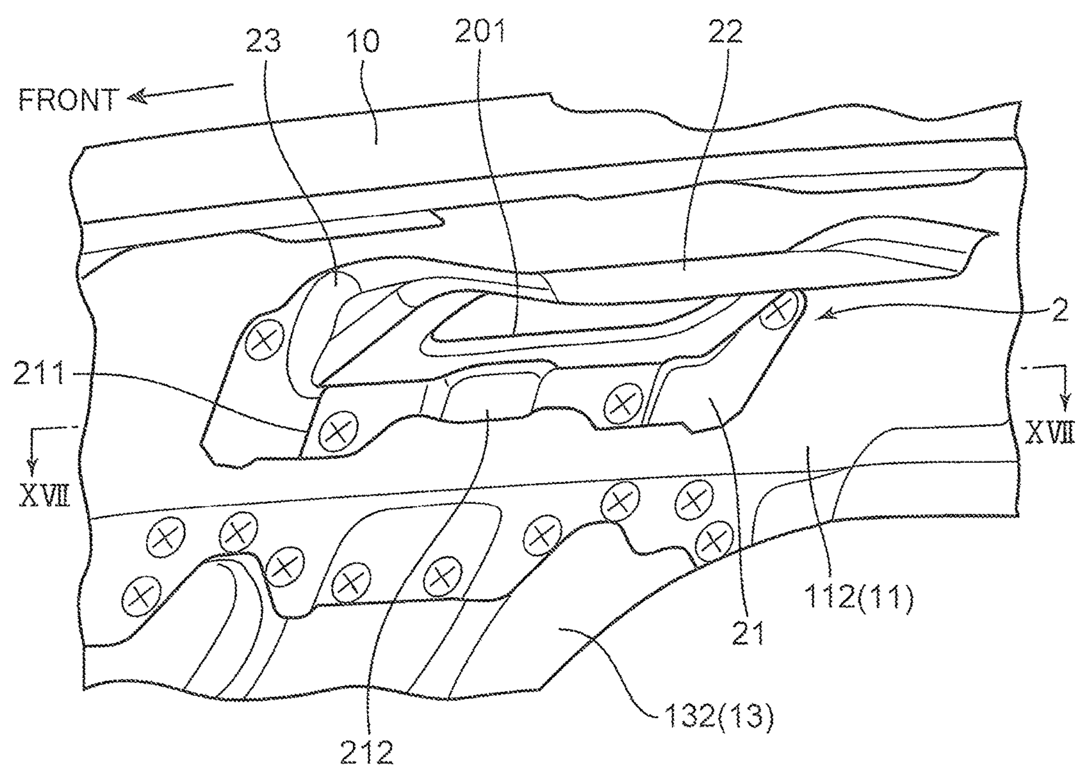
FIG. 14 is a perspective view, in a different angle, of the portion where the roof gusset is mounted.
Figure 15:
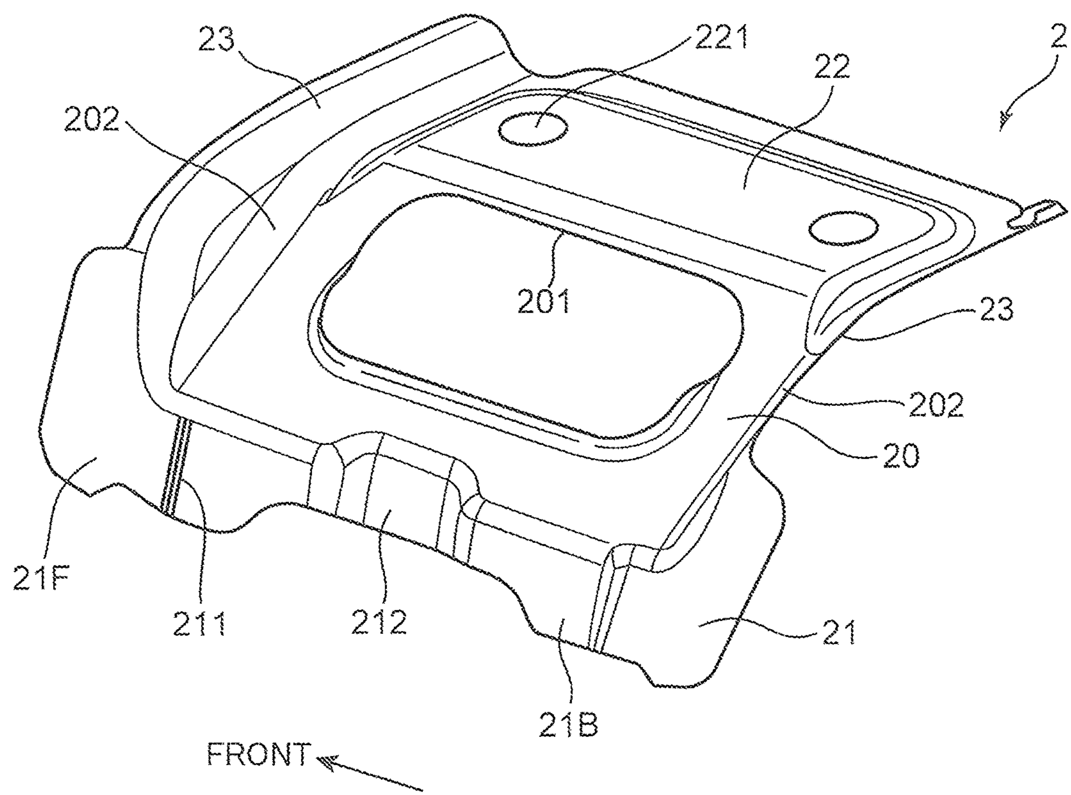
FIG. 15 is a perspective view of the roof gusset alone.
Figure 16:
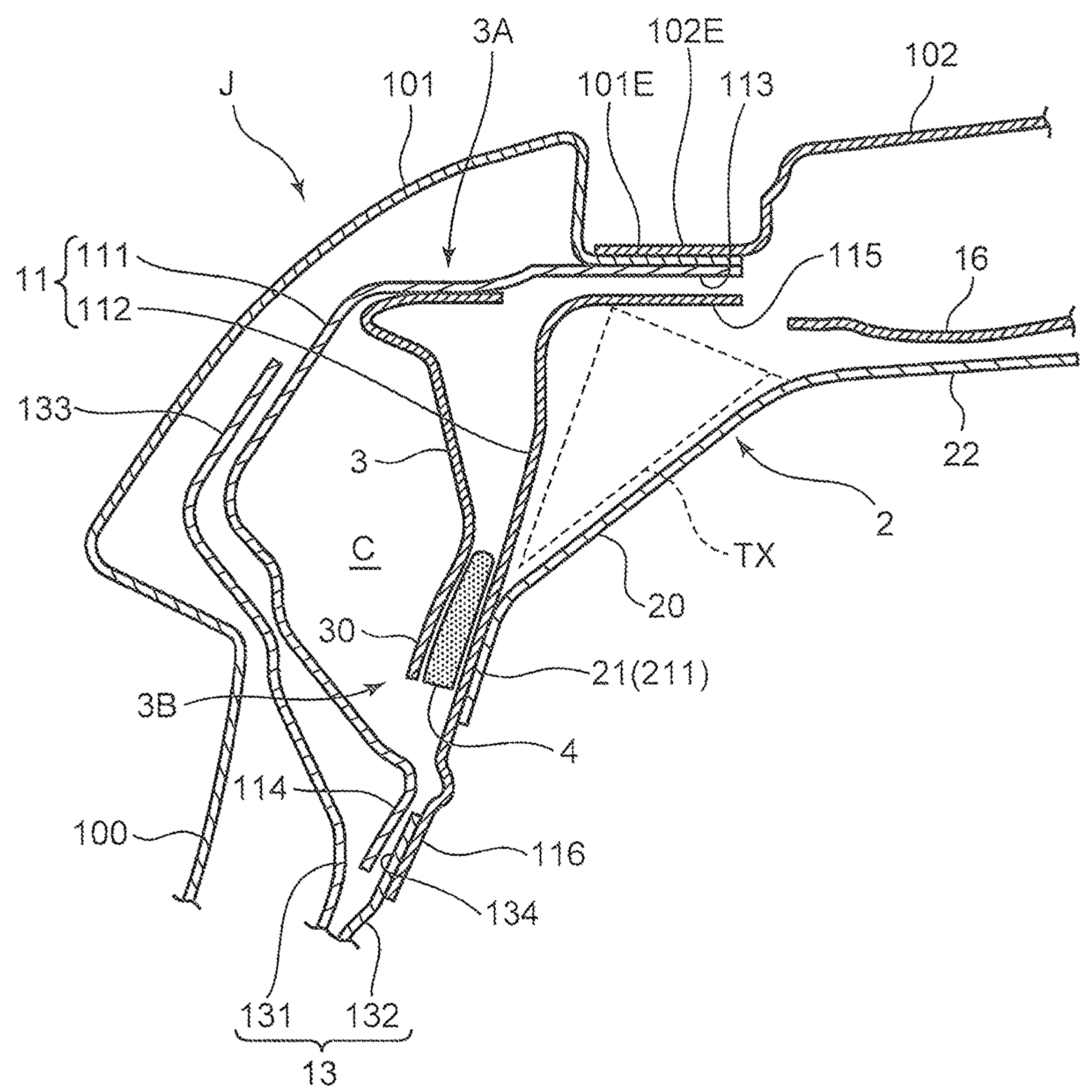
FIG. 16 is a schematic sectional view taken along line XVI-XVI of FIG. 13.
Figure 17:
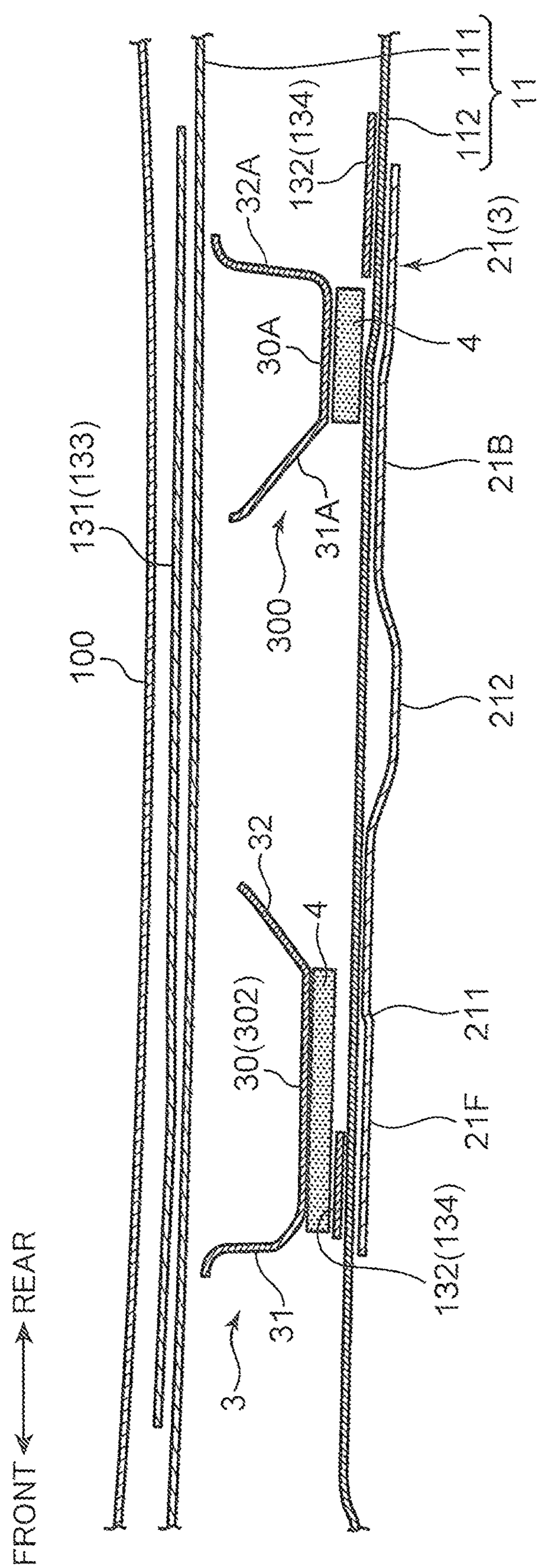
FIG. 17 is a schematic sectional view taken along line XVII-XVII of FIG. 14.

The roof gusset 2 will now be described in detail. FIG. 12 is a side view of the joint section J as seen from the indoor side of the vehicle, FIG. 13 is its perspective view, and FIG. 14 is its perspective view as seen from a direction different from that of FIG. 13. Each of these figures shows the state of the roof gusset 2 mounted to the joint section J. FIG. 15 is a perspective view of the roof gusset 2 alone. FIG. 16 is an enlarged view of the main components in FIG. 2, and FIG. 17 is a schematic sectional view taken along line XVII-XVII of FIG. 14.

The roof gusset 2 includes the main portion 20, the first abutment portion 21 (connection portion), the second abutment portion 22, and a pair of side plate portions 23. As described, the roof gusset 2, which is connected to the outer surfaces (surfaces at the indoor side) of the roof rail 11 and the roof reinforcement 16, is a vehicle-body member that reinforces the joint of the roof reinforcement 16 to the roof rail 11.

The roof gusset 2 is formed of material having high rigidity such as steel plate. The main portion 20, which is a mostly flat shaped portion, has a substantially rectangular opening 201 at the central part. The opening 201 is an opening that allows spot welding at a deep part to be carried out after the roof gusset 2 has been mounted. In the state where the roof gusset 2 is mounted on the vehicle-body 1, the main portion 20 is a portion slanted about 45° relative to the horizontal plane, the first abutment portion 21 is a portion protruding and extending downward from a lower end of the main portion 20, and the second abutment portion 22 is a portion protruding and extending inward in the vehicle-widthwise direction from an upper end of the main portion 20.

The first abutment portion 21, which is a flange portion having a width that allows spot welding, is connected to an indoor-side surface of the roof rail inner 112. The mark indicated with reference sign W3 in FIG. 12 shows a spot-welding portion of the first abutment portion 21 for the roof rail inner 112. As shown in FIG. 16, the first abutment portion 21 is connected to the roof rail inner 112 (first frame) so as to overlap, in the thickness direction of the roof rail inner 112, the flexible joint portion 3B where the damper member 4 is disposed.

The second abutment portion 22, which is a flange portion having a predetermined width, is put in contact with an indoor-side surface of the roof reinforcement 16. The second abutment portion 22 is perforated with a screw hole 221. The roof reinforcement 16, too, is provided with a screw hole. Screwing fixation screws into these screw holes fixes the second abutment portion 22 to the roof reinforcement 16.

The pair of side plate portions 23 is portions formed by bending upward from anteroposterior side portions of the main portion 20. At the boundaries of the pair of side plate portions 23 and the main portion 20, ridge portions 202, which are curving surfaces formed by the bending, are formed.

The roof gusset 2 thus configured has an ingenious feature for concentrating distortion stress caused in association with vibrations of the vehicle-body 1 on the damper member 4. This ingenious feature will be described. The first abutment portion 21 as described in FIG. 15 includes a front portion 21F and a rear portion 21B. In this embodiment, the part (at least a part of the other vehicle-body member) that overlaps the flexible joint portion 3B in the thickness direction is the front portion 21F of the first abutment portion 21. On this front portion 21F, a high rigidity portion 211 is formed for increasing rigidity. Meanwhile, between the front portion 21F and the rear portion 21B, a convex portion 212 (refer also to FIG. 17) that protrudes toward the indoor side is disposed.

The high rigidity portion 211 is a linear, stepped portion formed by deforming the first abutment portion 21 slightly in a direction of the outdoor side, as shown in FIG. 17. That is to say, the high rigidity portion 211 is a processed portion for higher rigidity that extends linearly. This stepped portion extends in a direction in conformance with the vertical direction (second direction) in which the center pillar 13 extends. This enhances rigidity of the first abutment portion 21, in particular, a rigidity in the vertical direction.

At the back of the high rigidity portion 211 thus configured, the damper member 4 is present, as shown in FIG. 16 and FIG. 17. That is to say, FIG. 16 is a sectional view, taken, in a part where the high rigidity portion 211 is present, along the direction in which this high rigidity portion 211 extends. This figure indicates that the base plate portion 30 of the bulkhead 3 and the damper member 4 overlap the high rigidity portion 211. Further, FIG. 17 indicates that the high rigidity portion 211 is provided at a position that allows it to overlap the lower portion 302, which is the wider part of the base plate portion 30.

As described, the high rigidity portion 211 for enhancing rigidity is provided, in the roof gusset 2, to the first abutment portion 21 that overlaps the flexible joint portion 3B, thus enhancing rigidity in the vicinity of the flexible joint portion 3B where the damper member 4 is disposed. This increases the difference in rigidity between the damper member 4 and its vicinity and achieves a structure that concentrates distortion stress caused in association with vibrations of the vehicle-body 1 on the damper member 4. When vibrations occur, this enables the damper member 4 alone exclusively to deform to allow it to exert a higher vibration damping effect.

Figure 18:
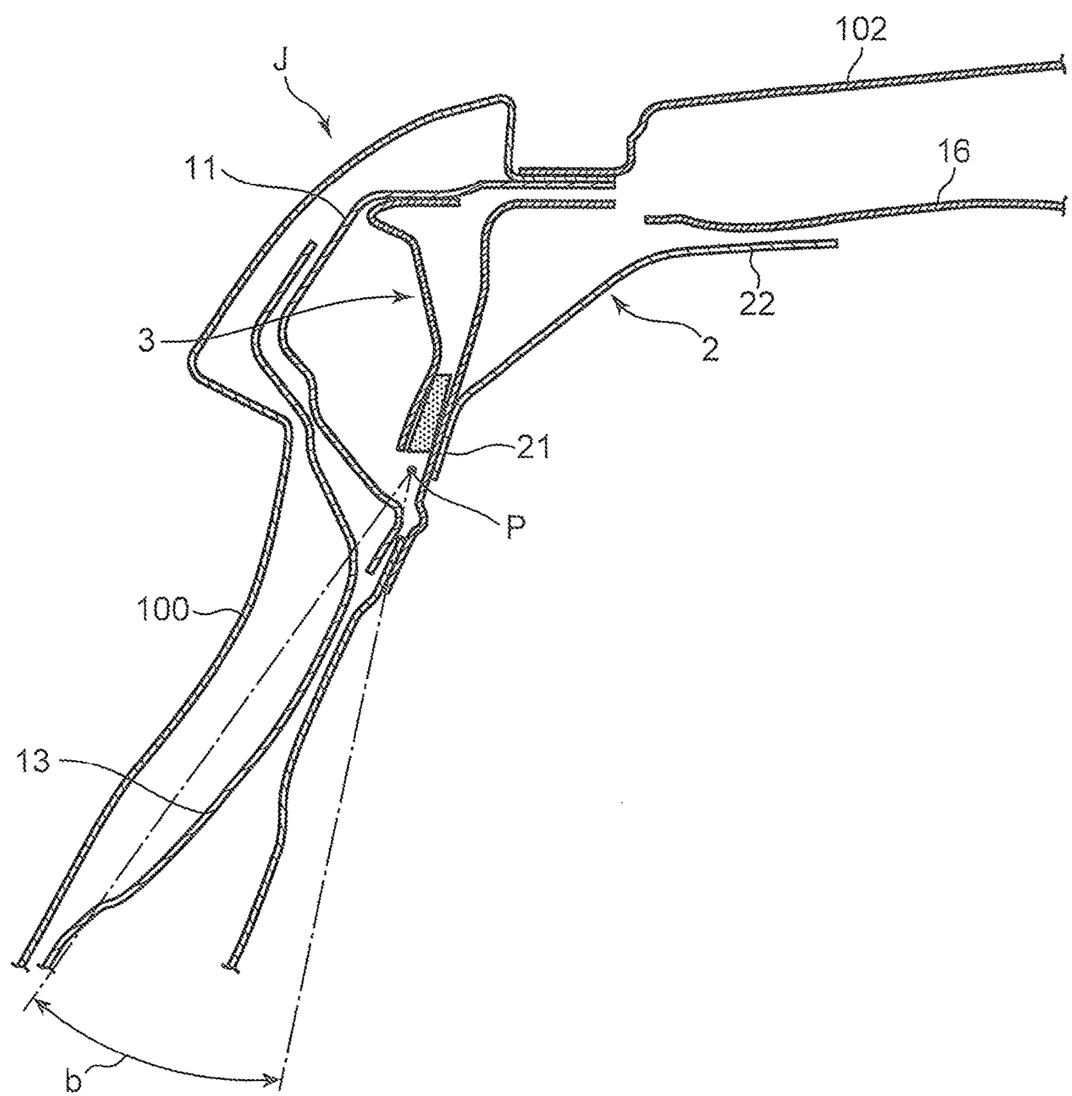
FIG. 18 is a sectional view for illustrating vehicle-widthwise swinging of the center pillar.

Further, the stepped portion of the high rigidity portion 211, which extends linearly in the vertical direction, allows the roof gusset 2 to have a high rigidity against vehicle-widthwise swinging of the center pillar 13. FIG. 18 is a sectional view illustrating vehicle-widthwise swinging of the center pillar 13. As described with reference to FIG. 9, the center pillar 13 swings in the anteroposterior direction on the imaginary point P as the center, which indicates the center of the connection of the center pillar 13 to the roof rail 11. Once vibrations occur in the vehicle-body 1, the center pillar 13 can swing on the point P as the center also in the vehicle-widthwise direction, or outward in a planar direction orthogonal to a plane that includes the roof rail 11 and the center pillar 13, as shown with the arrow b in FIG. 18. The high rigidity portion 211 has high resistance against stress caused when the center pillar 13 swings outward in the planar direction. This concentrates distortion stress on the damper member 4 when swinging occurs outward in the planar direction.

Further, the high rigidity portion 211 is provided at the position that allows it to overlap the lower portion 302, or the wider part of the connection region of the damper member 4, in the base plate portion 30 of the bulkhead 3. As described with reference to FIG. 9, the base plate portion 30 provided with the wider lower portion 302 allows the damper member 4 having a wider anteroposterior width to be disposed on a region where the center pillar 13 more largely swings and deforms. Besides, the high rigidity portion 211 disposed at the position that allows it to overlap the part of the damper member 4 that has a wider width exceptionally increases the difference in rigidity between the damper member 4 and its vicinity and further improves vibration damping performance in the flexible joint portion 3B.

In addition, as shown with the imaginary triangle TX in dotted line in FIG. 16, the roof rail inner 112 and the roof gusset 2 form a substantially triangular structure in a cross-section taken, at a part where the high rigidity portion 211 is present, in the vehicle-widthwise direction orthogonal to the anteroposterior direction of the vehicle-body 1. That is to say, in a corner where the roof rail 11 and the roof reinforcement 16 are joined orthogonal to each other, the main portion 20 of the roof gusset 2 forms a bridge between the roof rail inner 112 and the roof reinforcement 16 in a slanting direction so as to straddle the corner.

Thus, this structure formed so as to have the imaginary triangle TX further enhances rigidity of the joint section J. This allows distortion stress that the roof gusset 2 receives from a roof reinforcement 16-side to be reliably transmitted to the high rigidity portion 211 of the first abutment portion 21 through the main portion 20. Thus, this allows the stress to be effectively concentrated on the damper member 4 through the high rigidity portion 211, exerting an excellent vibration damping effect.

[Description of Modified Embodiments]

Although one embodiment according to the present invention has been described as above, the present invention, which is not limited to this embodiment, can take modified embodiments as the followings.

(1) The embodiment has shown an example in which the first frame is the roof rail 11, and the other vehicle member is the roof gusset 2. This is merely one application example of the present invention. The present invention can be widely applied to portions for combining various frames having a closed cross-section portion that are provided to the vehicle-body 1 and other vehicle-body members that are connected to the outer surface of the frames. However, the portion that incorporates the roof gusset 2 is a portion where relatively large distortion stress is caused in the vehicle-body 1. Applying the present invention to such a portion achieves an excellent vibration damping effect.

(2) The embodiment has shown an example in which the second frame is the center pillar 13 and constitutes the substantially T shaped joint section J together with roof rail 11. The second frame is not limited to the center pillar 13. Further, the joint section J may be a joint section where the second frame intersects the first frame in a substantially Y shape, or alternatively, a joint section where the first frame and the second frame intersect each other in a substantially X shape.

(3) The embodiment has shown the linear stepped portion as an example of the high rigidity portion 211 of the roof gusset 2. This is merely one example, and various processing for higher rigidity effect can be used to form the high rigidity portion 211. For example, the high rigidity portion 211 may be formed by drawing such as bead welding, ribbing, or the like.

(4) The embodiment has shown, as an example of the bulkhead 3, one provided with the base plate portion 30 of a trapezoidal shape having a width that gradually increases in the downward direction. This is merely one example, and any shape having a width that increases in a direction toward the center pillar 13 can be adopted for the base plate portion 30. Examples of this include a base plate portion having an anteroposterior width that increases in stair shape in the downward direction, and a base plate portion having an upper end of semi-circular shape, the base plate portion having an anteroposterior width that increases in the downward direction. In this regard, the anteroposterior width of the base plate portion 30 is not required to increase linearly in a downward direction, and may include a portion that partially decreases.

Finally, characteristic features and working effects thereof disclosed in the embodiment will be described in summary.

A vehicle-body structure according to the embodiment includes a first frame forming a closed cross-section portion and extending in a first direction, a reinforcing member disposed in the closed cross-section portion and connected to the first frame, and another vehicle-body member connected to an outer surface of the first frame, wherein a connection portion of the first frame and the reinforcing member includes a rigid joint portion where the first frame and the reinforcing member are joined in a state of coming in contact with each other, and a flexible joint portion where the first frame and the reinforcing member are joined, with a damper member being disposed therebetween, and the other vehicle-body member is connected to the first frame in a manner such that at least a part of the other vehicle-body member overlaps the flexible joint portion in a thickness direction of the first frame, and has a high rigidity portion that enhances rigidity at the part that overlaps the flexible joint portion.

The vehicle-body structure thus configured provides the high rigidity portion that enhances rigidity to the part of the other vehicle-body member that overlaps the flexible joint portion. This high rigidity portion enhances rigidity in the vicinity of the flexible joint portion where the damper member is disposed. This increases the difference in rigidity between the damper member and its vicinity and achieves a structure that concentrates distortion stress caused in association with vibrations of the vehicle on the damper member. When vibrations occur, this enables the damper member alone to deform to allow it to exert a higher vibration damping effect.

In the vehicle-body structure, it is preferable that the vehicle-body structure further include a second frame extending in a second direction that intersects the first direction, and having an end portion that is connected to the first frame, and forming a joint section where the second frame intersects the first frame, and that the high rigidity portion be a processed portion for higher rigidity that extends linearly, this processed portion extending in the second direction.

The vehicle-body structure thus configured enables the high rigidity portion to have higher resistance against stress caused when the second frame swings outward in the planar direction orthogonal to the plane (plane that includes the first frame and the second frame) that includes the first direction and the second direction. This concentrates distortion stress on the damper member when swinging occurs outward in the planar direction.

In the vehicle-body structure, it is preferable that a connection region of the reinforcing member that contacts the damper member in the flexible joint portion has a shape having a width that increases in the second direction toward the second frame, and the high rigidity portion be disposed at a position that allows the high rigidity portion to overlap at least a wider part of the connection region.

In the joint section where the second frame is mounted so as to intersect the first frame, the second frame swings on a joint point of the both as the center. In view of this property, the vehicle-body structure thus configured makes the connection region of the damper member be of a shape having a width that increases with increasing distance from the end portion of the second frame in the second direction. This allows the damper member having a wider width to be disposed on the region where the second frame more largely swings and deforms. The high rigidity portion disposed at the position that allows it to overlap such a wider part exceptionally increases the difference in rigidity between the damper member and its vicinity and further improves vibration damping performance in the flexible joint portion.

In the vehicle-body structure, it is preferable that the first frame be a roof rail, and the other vehicle-body member be a roof gusset, the roof rail include a roof rail outer member and a roof rail inner member, and the roof gusset include a connection portion that is connected to the roof rail inner member, and the high rigidity portion be formed in the connection portion.

The portion that incorporates the roof gusset is a portion where relatively large distortion stress is caused in the vehicle. Applying the present invention to such a portion achieves an excellent vibration damping effect.

In this case, it is preferable that the roof rail inner member and the roof gusset form a substantially triangular structure in a cross-section, orthogonal to an anteroposterior direction of the vehicle, taken at a part where the high rigidity portion is present.

This vehicle-body structure forms the substantially triangular shaped structure to further enhance rigidity and enable distortion stress that the roof gusset receives to be reliably transmitted to the high rigidity portion of the connection portion. This allows the stress to be effectively concentrated on the damper member through the highly rigid portion, exerting an excellent vibration damping effect.

In a vehicle-body structure including a structure where a reinforcing member having a damper member is disposed in a closed cross-section portion, the present invention as described effectively exerts vibration damping performance by means of the damper member, improving riding comfort (the sense of damped vibration) of the vehicle.

The invention claimed is:

1. A vehicle-body structure of a vehicle comprising:

a first frame forming a closed cross-section portion and extending in a first direction;

a reinforcing member disposed in the closed cross-section portion and connected to the first frame; and another vehicle-body member connected to an outer surface of the first frame, wherein a connection portion of the first frame and the reinforcing member includes a rigid joint portion where the first frame and the reinforcing member are joined in a state of coming in contact with each other, and a flexible joint portion where the first frame and the reinforcing member are joined, with a damper member being disposed therebetween, the other vehicle-body member is connected to the first frame in a manner such that at least a part of the other vehicle-body member overlaps the flexible joint portion in a thickness direction of the first frame and has an enhanced portion that enhances rigidity at the part that overlaps the flexible joint portion, the first frame is a roof rail, and the other vehicle-body member is a roof gusset, the roof rail includes a roof rail outer member and a roof rail inner member, and the roof gusset includes a connection portion that is connected to the roof rail inner member, and the enhanced portion is formed in the connection portion.

2. The vehicle-body structure of a vehicle according to claim 1, further comprising:

a second frame extending in a second direction that intersects the first direction, and having an end portion that is connected to the first frame, and forming a joint section where the second frame intersects the first frame, wherein the enhanced portion is a step formed portion for higher rigidity that extends linearly, this step formed portion extending in the second direction.

3. The vehicle-body structure of a vehicle according to claim 2, wherein a connection region of the reinforcing member that contacts the damper member in the flexible joint portion has a shape having a width that increases in the second direction toward the second frame, and the enhanced portion is disposed at a position that allows the enhanced portion to overlap at least a wider part of the connection region.

4. The vehicle-body structure of a vehicle according to claim 1, wherein the roof rail inner member and the roof gusset form a substantially triangular structure in a cross-section, orthogonal to an anteroposterior direction of the vehicle, taken at a part where the enhanced portion is present.

5. The vehicle-body structure of a vehicle according to claim 2, wherein the roof rail inner member and the roof gusset form a substantially triangular structure in a cross-section, orthogonal to an anteroposterior direction of the vehicle, taken at a part where the enhanced portion is present.

6. The vehicle-body structure of a vehicle according to claim 3, wherein the roof rail inner member and the roof gusset form a substantially triangular structure in a cross-section, orthogonal to an anteroposterior direction of the vehicle, taken at a part where the enhanced portion is present.

* * * * *